US007135801B2

(12) United States Patent
Yagi (10) Patent No.: US 7,135,801 B2
(45) Date of Patent: Nov. 14, 2006

(54) MOTOR APPARATUS HAVING ROTATIONAL POSITION DETECTOR (75) Inventor: Hideyuki Yagi, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 0 days.

(21) Appl. No.: 11/199,067

(22) Filed: Aug. 9, 2005

(65) Prior Publication Data

US 2006/0043803 A1 Mar. 2, 2006

(30) Foreign Application Priority Data

Aug. 24, 2004 (JP) ............................. 2004-244157
Aug. 24, 2004 (JP) ............................. 2004-244159

(51) Int. Cl.
*H01R 39/38* (2006.01)
*H02K 13/00* (2006.01)
*H02K 7/06* (2006.01)
*H02K 11/00* (2006.01)

(52) U.S. Cl. ...................... 310/239; 310/83; 310/75 R; 310/68 R (58) Field of Classification Search ............. 310/68 D, 310/68 E, 83, 75 R, 239
See application file for complete search history.

(56) References Cited

U.S. PATENT DOCUMENTS

| 4,398,135 | A | | 8/1983 | Busch et al. | |
|---|---|---|---|---|---|
| 4,639,065 | A | * | 1/1987 | Kohler et al. | 439/540.1 |
| 5,063,317 | A | * | 11/1991 | Bruhn | 310/91 |
| 5,140,207 | A | * | 8/1992 | Baumeister et al. | 310/83 |
| 5,218,255 | A | | 6/1993 | Horiguchi | |
| 5,256,950 | A | * | 10/1993 | Matsumoto et al. | 318/443 |
| 5,453,649 | A | * | 9/1995 | Blanchet | 310/71 |
| 5,500,564 | A | * | 3/1996 | Sano et al. | 310/83 |
| 5,983,484 | A | * | 11/1999 | Harada et al. | 29/596 |
| 6,249,098 | B1 | * | 6/2001 | Miyazaki et al. | 318/280 |
| 6,376,962 | B1 | * | 4/2002 | Lauk et al. | 310/239 |
| 6,396,230 | B1 | * | 5/2002 | Lauk | 318/443 |
| 6,410,849 | B1 | | 6/2002 | Okabe et al. | |
| 6,481,550 | B1 | | 11/2002 | Yamamoto et al. | |
| 6,727,613 | B1 | | 4/2004 | Kawakami et al. | |

(Continued)

FOREIGN PATENT DOCUMENTS

JP U-59-141478 9/1984

(Continued)

OTHER PUBLICATIONS

Search Report from European Patent Office issued on Apr. 25, 2006 for the corresponding European patent application No. 05017644.5-2424 (a copy thereof).

(Continued)

*Primary Examiner*—Darren Schuberg
*Assistant Examiner*—Erik Preston
(74) *Attorney, Agent, or Firm*—Posz Law Group, PLC (57) ABSTRACT

A motor apparatus is provided with a yoke housing, a gear housing and a brush holder. A receiving portion of the gear housing receives the worm wheel, etc. therein. The brush holder is interposed between the yoke housing and the gear housing. The worm wheel is provided with a switching plate on one side face thereof, which is in slide contact with contact members. The gear housing is provided with a housing body and a cover. In the housing body is formed a communication hole to communicate an internal spaces of the receiving portion and a yoke housing. The contact members are disposed on the brush holder and on the bottom portion side of the receiving portion with respect to the worm wheel so as to extend through the communication hole into the gear housing.

21 Claims, 6 Drawing Sheets

U.S. PATENT DOCUMENTS

| | | |
|---|---|---|
| 6,787,953 B1 | 9/2004 | Torii |
| 2001/0022475 A1* | 9/2001 | Uchida et al. ............ 310/68 C |
| 2002/0011390 A1 | 1/2002 | Yamamoto et al. |
| 2003/0173843 A1* | 9/2003 | Sakai et al. .................... 310/71 |
| 2004/0066111 A1* | 4/2004 | Torii ........................... 310/239 |
| 2005/0097698 A1* | 5/2005 | Yagi et al. ................. 15/250.3 |
| 2005/0097699 A1 | 5/2005 | Yagi et al |
| 2005/0151432 A1* | 7/2005 | Kano ........................... 310/71 |

FOREIGN PATENT DOCUMENTS

| | | |
|---|---|---|
| JP | U-6-44371 | 6/1994 |
| JP | A-2003-299315 | 10/2003 |

OTHER PUBLICATIONS

Search Report from European Patent Office issued on April 25, 2006 for the related European patent application No. 06001025.3-2424 (a copy thereof).

* cited by examiner

MOTOR APPARATUS HAVING ROTATIONAL POSITION DETECTOR

CROSS REFERENCE TO RELATED APPLICATION

This application is based upon and claims the benefit of priority of Japanese Patent Applications No. 2004-244157 filed on Aug. 24, 2004 and No. 2004-244159 filed on Aug. 24, 2004, the contents of which are incorporated herein by reference.

FIELD OF THE INVENTION

The present invention relates to a motor apparatus having a rotational position detector, especially the motor apparatus suitable for wiper system of a vehicle.

BACKGROUND OF THE INVENTION

Conventionally, a motor apparatus is in use that has a motor unit provided with an armature and a gear unit provided with a speed reduction mechanism. In the speed reduction mechanism, a face of a wheel gear is provided with a switching plate having a specific conductor pattern thereon, and a gear housing of the gear unit is provided with a fixed terminal (refer to JP-06-44371-U, for example). In this kind of motor apparatus, a contact between the switching plate and the fixed terminal, which are in accordance with a rotational position of the wheel gear, serves as a switching detector, so that the motor apparatus is suitable for a wiper motor, for example. That is, this kind of motor apparatus is provided with a so-called automatic return-and-stop mechanism. When a wiper switch is turned off to stop an operation of a wiper system, the motor apparatus does not stop at once, but stops after moving the wiper arm to a specific off position on a window of a vehicle.

In the above-described motor apparatus according to JP-06-44371-U, the gear housing includes a housing body, which is provided with a receiving depressed portion to receive the wheel gear, etc., and a cover, which is fixed on the receiving depressed portion to cover that. On a bottom portion of the receiving depressed portion is formed a receiving portion. An output shaft of the motor apparatus is inserted into and supported by the receiving portion. The wheel gear, a motion conversion mechanism to convert a rotational rotation of the wheel gear into a reciprocating swing motion of the output shaft, the fixed terminal and the cover are assembled in turn in an axial direction of the receiving portion, namely in a depressing direction of the receiving portion.

However, the receiving portion disposes both a mechanically moving structure such as the motion conversion mechanism and an electrical structure such as the fixed terminal and the switching plate of the wheel gear in a single space therein. Thus, it is necessary to dispose the mechanically moving structure and the electrical structure so as to avoid an interference between them, thereby an electrical wiring structure is disposed outside the gear housing. Accordingly, a connector unit (wiring), which is fixed outside the gear housing, connects a connection terminal of the fixed terminal and a connection terminal connected to a brush to energize the armature, to make a wiring structure long and complicated, to increase the number pf parts and working processes, and to decrease a reliability of a waterproofness of the wiring structure.

SUMMARY OF THE INVENTION

The present invention is achieved to solve the above-described issues, and has an object to provide a motor apparatus, of which a wiring structure can be short and simple, a waterproofness of the wiring structure can be secured easily and reliably and further an assembling workability is improved.

The motor apparatus has a motor unit, a connector portion and a speed reduction unit. The motor unit is provided with an internal terminal and energized via the internal terminal. The connector portion has an external terminal. The speed reduction unit is provided with a worm shaft, a worm wheel, a switching plate and a gear housing. The worm shaft is rotationally driven by the motor unit. The worm wheel reduces and outputs a rotation of the worm shaft. The switching plate integrally rotates with the worm wheel and has a predetermined electrical conductor pattern to come in contact with the internal terminal and the external terminal in accordance with a rotational position of the worm wheel to connect and disconnect between the external terminal and the internal terminal. The gear housing is fixed to the motor unit and encloses the worm shaft, the worm wheel and the switching plate therein. The gear housing is provided with a communication hole, which is covered by an outer face of the motor unit and lets the internal terminal and the external terminal therethrough toward the switching plate.

BRIEF DESCRIPTION OF THE DRAWINGS

Other objects, features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

Figure 1:
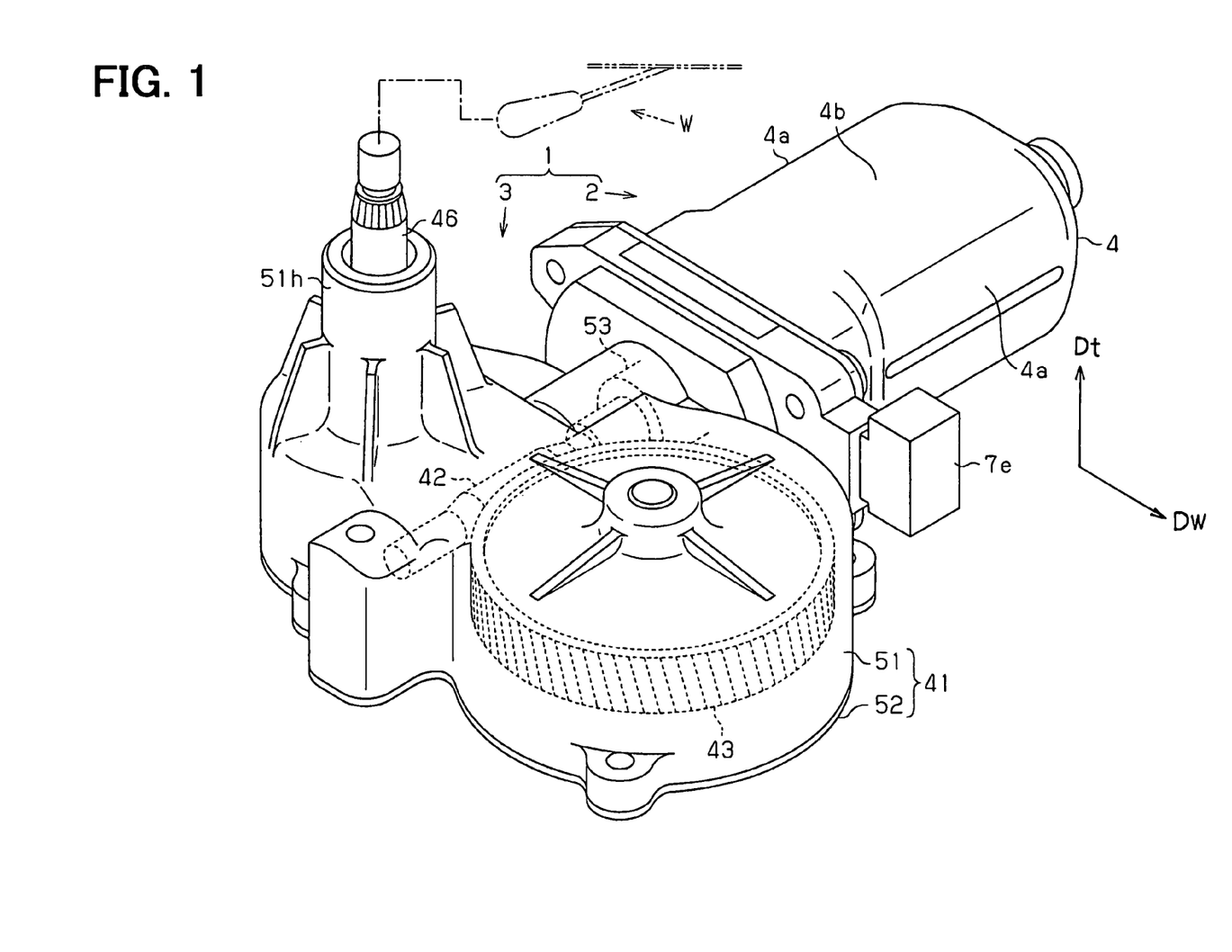
FIG. 1 is a perspective view showing a motor apparatus according to an embodiment of the present invention.

In the following is described a motor apparatus according to an embodiment of the present invention. A motor apparatus 1 is for actuating a wiper system (specifically a rear wiper system). As shown in FIG. 1, the motor apparatus 1 is provided with a motor unit 2 and gear unit (speed reduction unit) 3.

Figure 2:
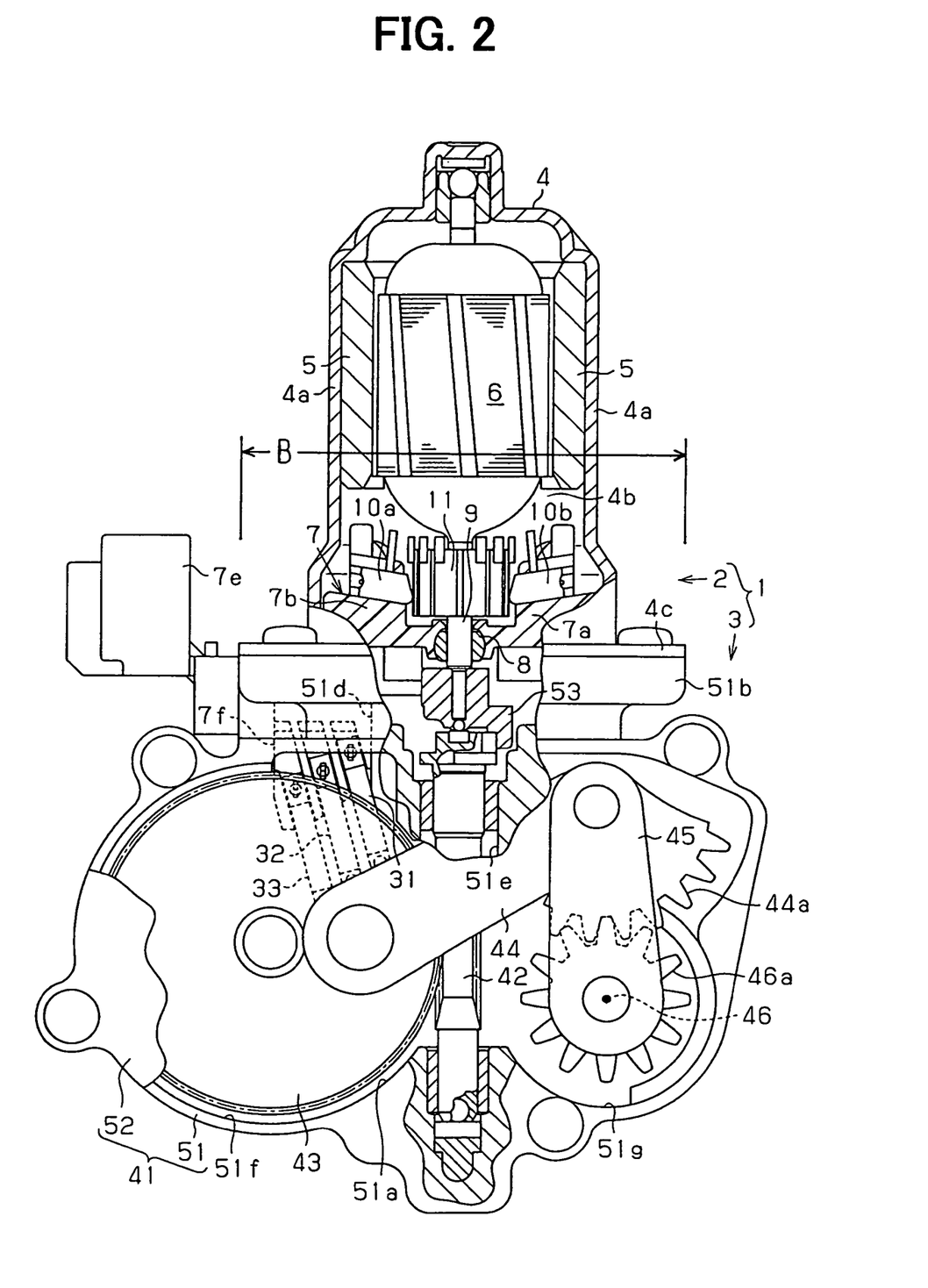
FIG. 2 is a cross-sectional view showing a principal portion of the motor apparatus according to the embodiment.

The motor unit 2 is provided with a yoke housing 4 formed in an approximately cylindrical shape with a bottom. The yoke housing 4 has a circumferential face including a pair of arc portions 4a and a pair of flat portions 4b. The flat portions 4a are disposed radially outward with respect to the flat portions 4b. As shown in FIG. 2, the motor unit 2 is further provided with a pair of magnets 5 and an armature 6. The yoke housing 4 encloses the magnets 5 and the armature 6 therein. The yoke housing 4 holds the magnets 5 on an inner face of the arc portions 4b, and rotatably supports the armature 6. The arc portions 4a are opposed to each other in a width direction Dw of the motor unit 2, which is perpendicular to a rotational axis of the armature 6. The flat portions are in parallel with and opposed to each other in a thickness direction Dt of the motor unit 2, which is perpendicular to the width direction Dw and to the rotational axis of the armature 6. The flat portions 4b connect the arc portions 4a. At a brim of an opening end of the yoke housing 4 is formed a flange portion 4c to extend radially outward.

At the opening end of the yoke housing 4 is disposed a brush holder 7. The brush holder 7, as shown in FIGS. 2 to 5, is provided with a brush holder resin body 7a, which is made of an electrical insulating resinous material. The brush holder resin body 7a is an integrated body of a holder body portion 7b, a flange portion 7c (refer to FIG. 4), an extension portion 7d, a connector portion 7e and a contact base portion 7f.

The holder body portion 7b is installed approximately inside an opening side portion of the yoke housing 4. As shown in FIG. 2, the holder body portion 7b is provided with a center hole to hold a bearing 8 therein. The bearing 8 rotatably supports a leading end side portion of a rotation shaft 9 of the armature 6. Further, the holder body portion 7b holds brushes 10a, 10b of the motor unit 2, which is for energizing the armature 6. The brushes 10a, 10b are disposed inside the yoke housing 4 and in pressure contact with a rectifier 11, which is fixed on the rotation shaft 9. The flange portion 7c extends radially outward from the holder body portion 7b in a flange-like manner. The extension portion 7d extends in the width direction Dw of the motor unit 2 from a part of the flange portion 7c to a position radially outer than the arc portions 4a of the yoke housing 4 with respect to the rotation shaft 9.

The connector portion 7e is formed at a leading end of the extension portion 7d. The connector portion 7e is formed to snap an external connector (not shown) thereto in an axial direction of the armature 6 (downward in FIG. 2). Specifically, the connector portion 7e has an approximately rectangular tube shape that opens at one end thereof in the axial direction of the armature 6 (upper side end in FIG. 2) to have a C-shaped cross-section. The connector portion 7e is disposed at a side of one of the arc portions 4a (one arc portion 4a) of the yoke housing 4. An outline of the connector portion 7e is disposed within a range T (refer to FIG. 7) between the pair of the flat portions 4b in the thickness direction Dt of the motor unit 2.

Figure 4:
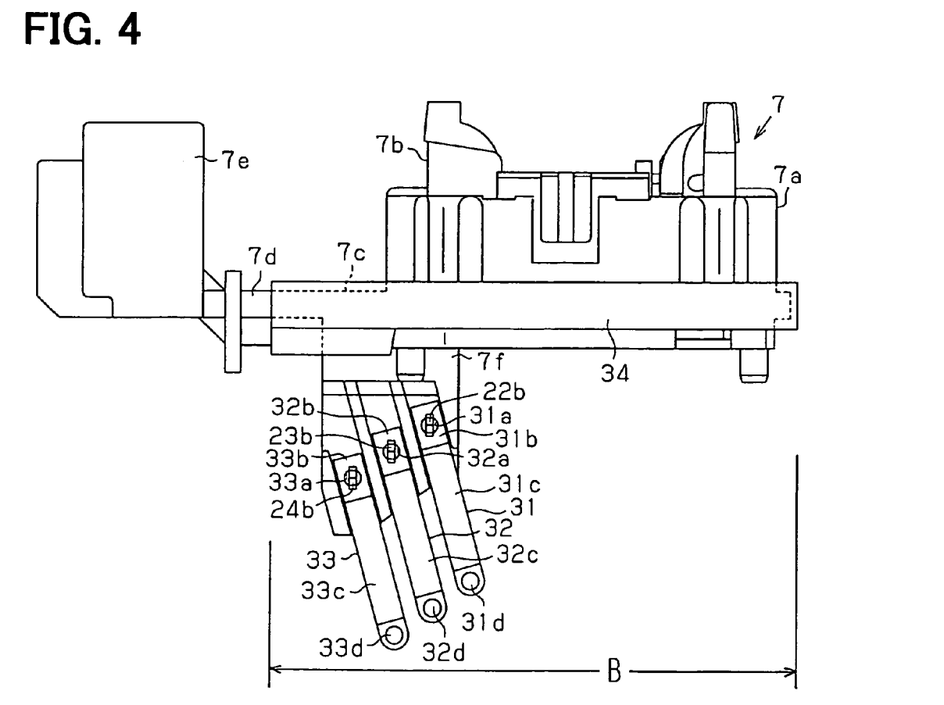
FIG. 4 is a side view showing the brush holder of the motor apparatus according to the embodiment.
Figure 5:
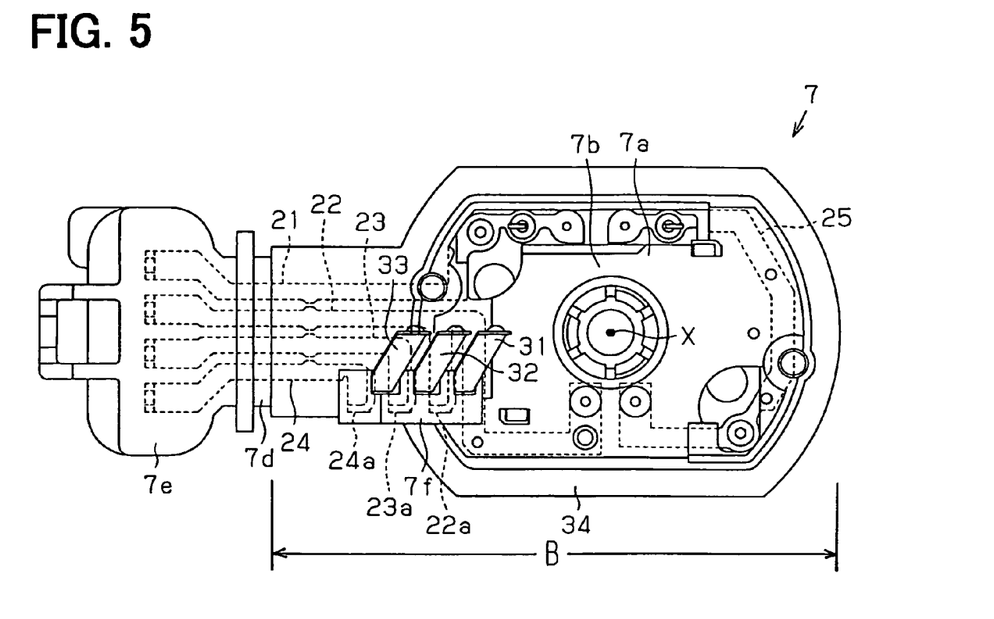
FIG. 5 is a bottom view of the brush holder of the motor apparatus according to the embodiment.

As shown in FIGS. 2 and 4, the contact base portion 7f extends from a part of the brush holder resin body 7a, which is between the holder body portion 7b and the connector portion 7e and corresponds to the extension portion 7d and/or the flange portion 7c, away from the yoke housing 4 (downward in the figures). As shown in FIG. 5, the contact base portion 7f is disposed in a butt joining region B, in which the yoke housing 4 and the gear housing 41 are butt-joined to each other to interpose the brush holder resin body 7a therebetween, so as to be closer to one of the flat portions 4b (one flat portion 4b) than to the other of the flat portions 4b (the other flat portion 4b) in the thickness direction Dt of the motor unit 2 (at a lower side in FIG. 5). The contact base portion 7f has a plate-like shape, which is thin in the thickness direction Dt of the motor unit 2 (refer to FIG. 1).

As shown in FIG. 5, the brush holder 7 is further provided with five terminals 21–25, which are made of electrical conducting metal plates. Each of the terminals 21–25 is embedded in the brush holder resin body 7a to expose a part thereof.

Figure 3:
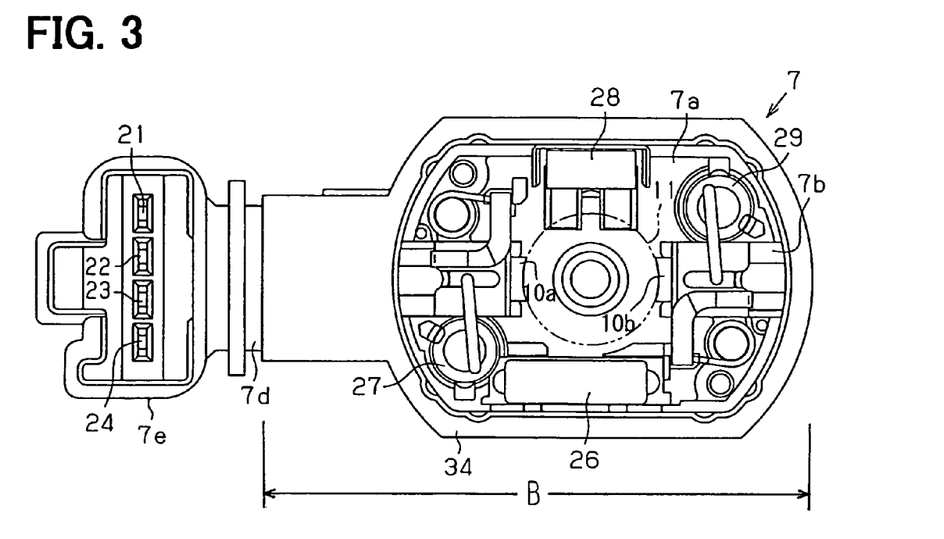
FIG. 3 is a plan view showing a brush holder of the motor apparatus according to the embodiment.

The terminal 21 is for a first power source (high voltage power source). As shown in FIGS. 3 and 5, one end portion of the terminal 21 is exposed outside the connector portion 7e. The terminal 21 extends from the one end portion thereof to the holder body portion 7b. The other end portion of the terminal 21 is connected to a first terminal of a capacitor 26, which is mounted on the holder body portion 7b. The other end is also connected via a choke coil 27, which is mounted on the holder body portion 7b, to the brush 10a.

Figure 6:
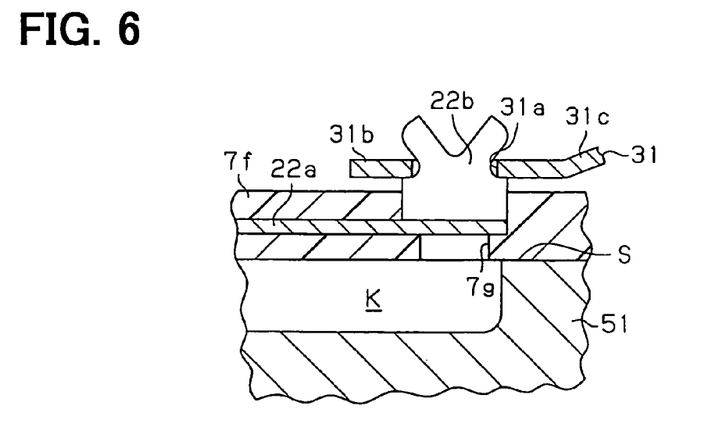
FIG. 6 is a cross-sectional view of a connection portion between a contact terminal and a contact member of the motor apparatus according to the embodiment.

The terminal 22 is for a second power source (low voltage power source). One end portion of the terminal 22 is exposed outside the connector portion 7e. The terminal 22 extends from the one end portion thereof to the holder body portion 7b. The other end portion of the terminal 22 is connected to a first terminal of a circuit breaker 28, which is mounted on the holder body portion 7b. The terminal 22 is provided with a contact terminal 22a, which is branched between the one and the other end portions thereof. The contact terminal 22a extends to the contact base portion 7f. As shown in FIG. 6, the contact terminal 22a is provided with a rise portion 22b at a (most) leading end portion thereof in the contact base portion 7f. The contact terminal 22a is disposed so that a plate thickness direction thereof is in parallel with the thickness direction Dt of the motor unit 2 (refer to FIG. 1), or in other words, so that a plate flatness direction thereof is in parallel with the width direction Dw of the motor unit 2. The rise portion 22b is bent to protrude over one face (an upper surface in FIGS. 5 and 6) of the contact base portion 7f, which is closer to the other flat portion 4b than to the one flat portion 4b. FIG. 6 depicts the rise portion 22b, which is cottered as described below.

The terminal 23 is for a first fixed contact. One end portion of the terminal 23 is exposed outside the connector portion 7e. Another end portion of the terminal 23 forms a contact terminal 23a, which is disposed in parallel with the contact terminal 22a. As shown in FIG. 4, the contact terminal 23a is provided with a rise portion 23b at a (most) leading end portion of the contact terminal 23a. The rise portion 23b has substantially the same shape as the rise portion 22b.

The terminal 24 is for the second fixed contact. One end portion of the terminal 24 is exposed outside the connector portion 7e. Another end portion of the terminal 24 forms a contact terminal 24a, which is disposed in parallel with the contact terminals 22a, 23a. As shown in FIG. 4, the contact terminal 23a is provided with a rise portion 23b at a (most) leading end portion of the contact terminal 23a. The rise portion 23b has substantially the same shape as the rise portions 22b, 23b. As shown in FIGS. 2 and 4, the leading end portions of the contact terminals 22a–24a (the rise portions 22b–24b) are aligned to be inclined to the rotation axis of the armature 6.

The terminal 25 is for a middle connection and disposed on the holder body portion 7b. As shown in FIGS. 3 and 5, one end portion of the terminal 25 is connected to a second terminal of the capacitor 26. The other end portion of the connector 25 is connected to a second terminal of the circuit breaker 28. A middle portion of the terminal 25 is connected via a choke coil 29, which is mounted on the holder body portion 7b, to the brush 10b.

As shown in FIGS. 2, 4 and 5, the brush holder 7 is further provided with contact members 31–33. The contact members 31–33 are respectively electrically connected to the most leading end portions of the contact terminals 22a–24a, namely the rise portions 22b–24b. Specifically, each of the contact members 31–33 is made of an electrical conducting metal plate having specific elasticity to serve as a leaf spring. As shown in FIGS. 4 and 6, each of the contact members 31–33 is provided with a base end portion 31b–33b, an inclined portion 31c–33c and a leading end portion 31d–33d. Each of the base end portion 31b–33b is provided with a through hole 31a–33a. The leading end portions 31d–33d are formed at the leading end of the inclined portions 31c–33c. The inclined portion 31c–33c extend from the base end portion 31b–33b to the leading end portions 31d–33d to be elastically bent and inclined to the one face of the contact base portion 7f. As shown in FIG. 6, the contact members 31–33 are respectively fixed on the rise portions 22b–24b by inserting the rise portions 22b–24b through the through holes 31a–33a and cottering them. The contact base portion 7f is provided with assembly bores 7g on the other face thereof so that the assembly bores 7g align with the rise portions 22b–24b. In cottering the contact members 31–33 onto the rise portions 22b–24b, an assembly jig is inserted into the assembly bores 7g to support the rise portions 22b–24b at bottom sides opposite from cottering sides thereof. The contact members 31–33 are aligned side by side to extend in parallel with each other. In the present embodiment, the contact terminals 22a–24a and the contact members 31–33 form three fixed contacts, which are aligned side by side on a plane in parallel with the flat portions 4b.

As shown in FIGS. 3 to 5, the brush holder 7 is provided with a seal 34 at the brush holder resinous body 7a. The seal 34 is made of elastomer and disposed to approximately surround the flange portion 7c, the extension portion 7d and so on.

As shown in FIGS. 1 and 2, the gear portion 3 is provided with a gear housing 41, a worm shaft 42, a worm wheel 43, a sector gear (sub gear) 44, a distance keeping plate 45 and an output shaft 46. In the present embodiment, the worm shaft 42 and the worm wheel 43 form a speed reduction mechanism and a worm speed reduction mechanism to reduce a rotation of the armature 6 and output a reduced rotation.

The gear housing 41 is provided with a housing body 51 and a cover 52. In the housing body 51 is formed a receiving depressed portion (receiving portion) 51a, which opens to the other flat portion 4b side in the thickness direction Dt of the motor unit 2, namely frontward in FIG. 2. The cover 52 is fixed on and covering the receiving depressed portion 51a (a part of which is shown in FIG. 2).

Figure 7:
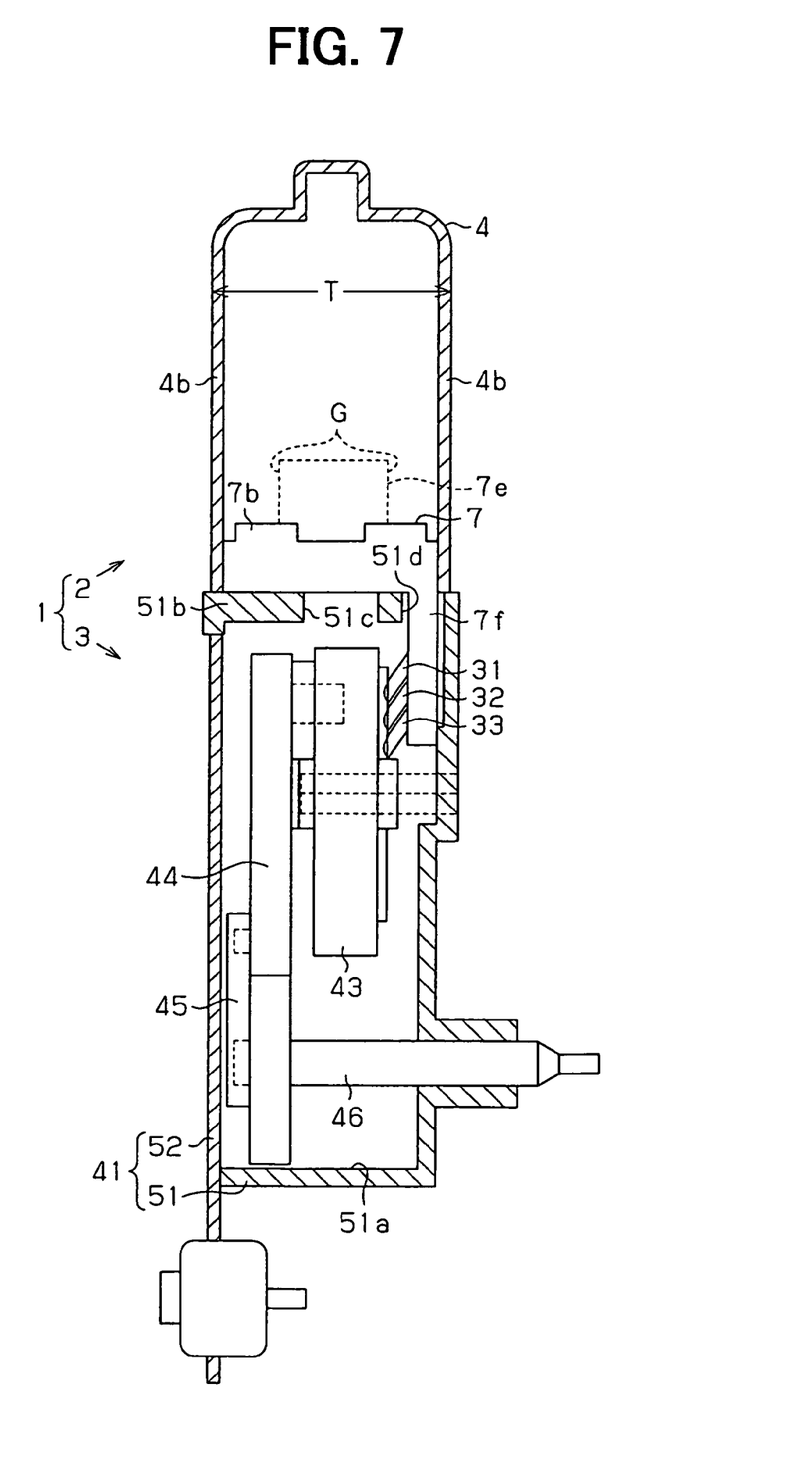
FIG. 7 is a schematic cross-sectional view of the motor apparatus according to the embodiment.

The housing body 51 is a die-cast member made of aluminum alloy, which is an electric conductor material. The yoke housing 4 side end portion of the housing body 51, which is a part of an outer wall of the receiving depressed portion 51a, forms a fixing portion 51b. The fixing portion 51b has a shape corresponding to the opening side portion (flange portion 4c) of the yoke housing 4. The housing body 51 is screw-fastened at the fixing portion 51b to the flange portion 4c of the yoke housing 4 so that the fixing portion 51b and the flange portion 4c of the yoke housing 4 interpose the flange portion 7c of the brush holder 7 and the seal 34 therebetween. That is, the yoke housing 4 and the gear housing 41 are connected so that the brush holder 7 is abutted therebetween. As shown in FIG. 7, the fixing portion 51b of the housing body 51 is further provided with a center hole 51c and a communication hole 51d, which respectively communicate an interior space of the receiving depressed portion 51a and an interior space of the yoke housing 4. In an assembled body of the yoke housing 4, the brush holder 7 and the gear housing 41, the leading end side portion of the rotation shaft 9 extends through the center hole 51c into the receiving depressed portion 51a of the gear housing 41, and the contact base portion 7f extends through the communication hole 51d into the receiving depressed portion 51a of the gear housing 41. The motor unit 2 and the gear housing 41 block the communication hole 51d from an outer space.

As described above, the receiving depressed portion 51a opens to the other flat portion 4b side in the thickness direction Dt of the motor unit 2, namely frontward in FIG. 2. Thus, the contact base portion 7f and the fixed contacts (the contact terminals 22a–24a and the contact members 31–33), which are closer to the one flat portion 4b than to the other flat portion 4b (rearward in FIG. 2), is disposed in a bottom portion side in the receiving depressed portion 51a with respect to the worm wheel 43. Further, as shown in FIG. 6, at a position on the bottom portion of the receiving depressed portion 51a of the housing body 51, which corresponds to a position of the contact base portion 7f, is provided with a contact face S to come in contact with the contact base portion 7f. The contact face S is formed on an inner face of the housing body 51 beyond the leading end portions of the contact terminals 22a–24a with respect to the assembly bores 7g of the contact base portion 7f. Thus, a leading end portion of the contact base portion 7f comes in contact with the contact face S. Furthermore, at a position on the bottom portion of the receiving depressed portion 51a of the housing body 51, which corresponds to the assembly bores 7g, is provided with a depression with respect to the contact face S. In the depression is formed a cavity K as an insulation portion to insulate the contact terminals 22a–24a from the housing body 51.

The receiving depressed portion 51a includes a worm receiving portion 51e, a wheel receiving portion 51f, an output shaft receiving portion 51g and so on, which communicates with one another therein.

The worm receiving portion 51e is formed to extend on an extension line of the rotation shaft 9, and rotatably supports the worm shaft 42 therein. A joint 53 connects the worm shaft 42 and the rotation shaft 9 so as to integrally rotate them.

Figure 8:
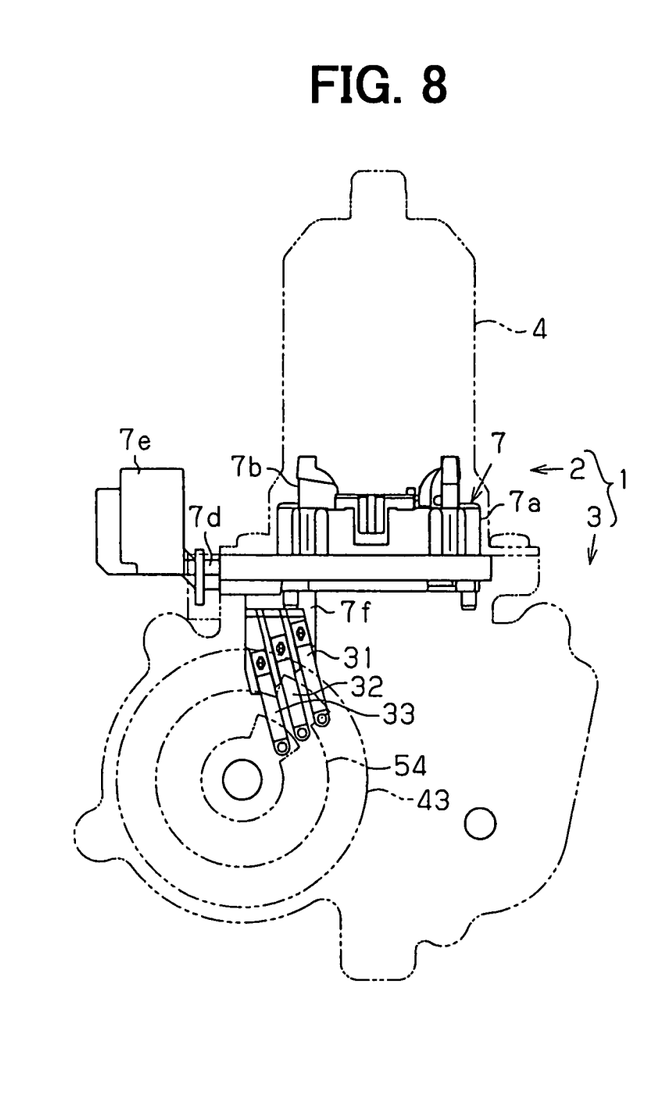
FIG. 8 is an explanatory diagram of a mechanism of a switching plate of the motor apparatus according to the embodiment.

As shown in FIG. 2, the wheel receiving portion 51f is disposed at the same side as the connector portion 7e with respect to the worm receiving portion 51e, and rotatably supports the worm wheel 43 therein. A part of the worm wheel 43 is engaged with the worm shaft 42. The worm wheel 43 is disposed so that a rotational axis thereof is in parallel to the thickness direction Dt of the motor unit 2. As shown in FIG. 8, on one side face of the worm wheel 43, which is opposed to a bottom face of the receiving depressed portion 51a, is provided with a switching plate 54. The switching plate 54 has a specific conductor pattern, which is conventionally known, thereon. Specifically, the switching plate 54 is integrally formed with the worm wheel 43. The leading end portions 31d–33d of the contact members 31–33 come in pressure and slide contact with the switching plate 54. Each of the leading end portions 31d–33d of the contact members 31–33 comes in and out of contact with the specific conductor pattern on the switching plate 54, in accordance with a rotational position of the worm wheel 43.

The output shaft receiving portion 51g is formed on an opposite side from the connector portion 7e and the wheel receiving portion 51f with respect to the worm receiving portion 51e. As shown in FIG. 1, the output shaft receiving portion 51g is provided with an output shaft supporting portion 51h at a center thereof to extending outward in a cylinder-like shape in the thickness direction Dt of the motor unit 2. The output shaft receiving portion 51g rotatably supports the output shaft 46. A base end portion of the output shaft 46 is disposed in the output shaft receiving portion 51g, and a leading end portion of the output shaft 46 protrudes out of the output shaft receiving portion 51g. The leading end portion of the output shaft 46 is associated with and actuates a wiper (rear wiper) W of a vehicle, which is schematically shown in FIG. 1.

The worm wheel 43 and the output shaft 46 are interlocked with each other by the sector gear 44 and the distance keeping plate 45. The sector gear 44 and the distance keeping plate 45 are respectively formed from metal plates. Specifically, a base end of the sector gear 44 is rotatably linked with a position of the worm wheel 43, which is radially displaced from the rotational axis thereof. At a leading end portion of the sector gear 44a is formed a gear portion 44, and at a base end portion of the output shaft 46 is formed a gear portion 46a to be engaged with the gear portion 44a of the sector gear 44. As shown in FIG. 7, the sector gear 44 is disposed on the opening side (left side in FIG. 7, frontward side in FIG. 2) of the receiving depressed portion 51a with respect to the worm wheel 43. One end portion of the distance keeping plate 45 is rotatably linked with a radial center of the gear portion 44a of the sector gear 44. The other end portion of the distance keeping plate 45 is rotatably linked with a base end portion of the output shaft 46. That is, the distance keeping plate 45 keeps a distance between the radial center of the gear portion 44a and a rotational axis of the output shaft 46. As shown in FIG. 7, the distance keeping plate 45 is disposed at the opening side (left side in FIG. 7, frontward side in FIG. 2) of the receiving depressed portion 51a with respect to the sector gear 44. Thus, the sector gear 44 (and the distance keeping plate 45) converts the rotation of the worm wheel 43 into a reciprocating rotational motion of the output shaft 46 to swing the wiper W reciprocatingly to wipe a surface of a rear window of a vehicle.

Next, an electric configuration of the motor apparatus 1 and an external control unit for controlling the wiper system will be described with reference to FIG. 9. The motor apparatus 1 and the external control unit are connected to each other by snapping the external connector of the external control unit to the connector portion 7e.

The terminals 21, 23, 24 exposed in the connector portion 7e are respectively connected to a selector switch 61 provided in a driver's seat of the vehicle. The terminal 22 is connected to the ground. The terminal 24 exposed in the connector portion 7e is connected to the power source E, namely a battery of the vehicle. In the present embodiment, the selector switch 61, the ground and the power source E forms the external control unit.

The selector switch 61 has an "off" position P1 to turn off the motor apparatus 1 and an "on" position P2 to turn on the motor apparatus 1. The selector switch 61 connects the terminal 21 to the terminal 23 when turned in the off position P1 connects the terminal 21 to the power source E when turned in the on position P2.

In the motor apparatus 1 having an electrical wiring as described above, when the selector switch 61 is turned in the on position P2, the brush 10a of the motor unit 2 is connected to the power source E to operate the motor apparatus 1. That is, the output shaft 46 comes in a reciprocating rotational motion to actuate the wiper W.

When the selector switch 61 is switched from the on position P2 into the off position P1, a direct connection between the brush 10a and the power source E is interrupted, and the brush 10a is connected via the terminal 23 to the contact member 32. Here, if the switching plate 54, which integrally rotates with the worm wheel 43, is in a specific angular position to connect the contact member 31 and the contact member 32, the terminal 23, which is connected to the brush 10a, is connected via the contact members 31, 32 to the ground, so that the motor apparatus 1 stops.

If the switching plate 54 is not in the specific angular position but in a position to connect the contact member 32 and the contact member 33, the terminal 23, which is connected to the brush 10a, is connected via the contact members 32, 33 to the power source E. Thus, the motor apparatus 1 continues to operate. Then, when the switching plate 54, integrally rotating with the worm wheel 43, comes up to the specific angular position, the terminal 23, which is connected to the brush 10a, is connected via the contact members 31, 32 to the ground, so that the motor apparatus 1 stops. That is, the selector switch 61 is switched from the on position P2 into the off position P1, a rotational position of the switching plate 54, which is detected by a contact between the contact members 31–33 (contact portions 31d–33d) and the switching plate 54, automatically stops the switching plate 54 and the worm wheel 43 at the specific angular position.

Figure 9:
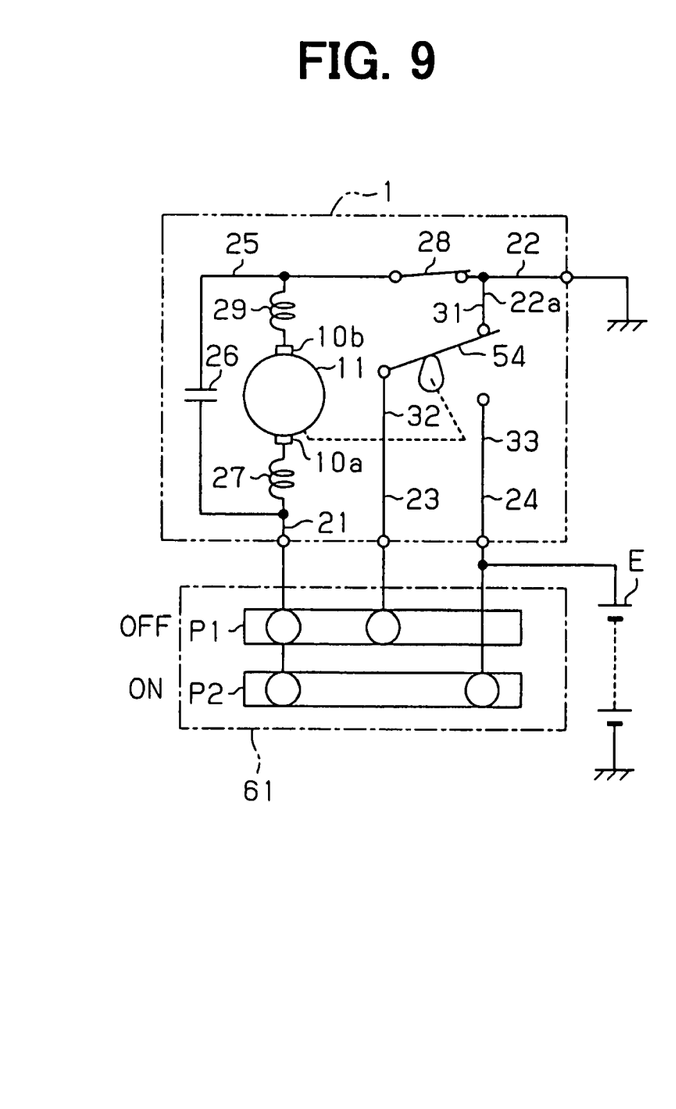
FIG. 9 is a schematic circuit diagram showing an electric structure of the motor apparatus according to the embodiment.

When the switching plate 54 and the worm wheel 43 are in the specific angular position as in a state shown in FIG. 9, the wiper W is configured to be in a specific off position such as a position along a lower end of the rear window. Thus, by switching the selector switch 61 from the on position P2 into the off position P1, the wiper W automatically stops at the specific off position.

Next, advantageous actions and effects of the motor apparatus 1 according to the above-described embodiment will be described in the following.

(1) The fixed contacts (the contact terminals 22a–24a and the contact members 31–33) are provided in the brush holder 7, so that electric devices are gathered in the brush holder 7 together with the brushes 10a, 10b. Thus, even in such a case that the contact terminal 22a and the contact member 31 are connected to the brush 10b, a wiring structure to connect them can be simplified into only the terminals 22, 25 provided at the brush holder 7. Further, even when the contact terminals 22a–24a and the contact members 31–33, together with the brushes 10a, 10b, are connected to the external control unit (the selector switch 61, ground and the power source E), a wiring structure to connect them can be simplified into only the terminals 21–25 provided in the brush holder 7.

Moreover, the fixed contacts (contact terminals 22a–24a and the contact members 31–33) are provided to extend from the brush holder 7 through the communication hole 51d, which is formed on the yoke housing 4 side end portion of the housing body 51 of the gear housing 41, into the receiving depressed portion 51a of the gear housing 41. Thus, it is possible to provide a wiring to connect the contact terminal 22a and the contact member 31 with the brush 10b, namely the terminals 22, 25, with shortness and waterproofness easily and securely than in a conventional motor apparatus having the wiring outside a gear housing.

Further, the fixed contacts (contact terminals 22a–24a and the contact members 31–33) are disposed at the bottom portion side of the receiving depressed portion 51a with respect to the worm wheel 43; thereby, the fixed contacts, which are disposed at the bottom portion side portion in the assembled body of the yoke housing 4, the housing body 51 and the brush holder 7, do not hamper the worm wheel 43 and so on from being installed in the receiving depressed portion 51a, regardless of an arrangement of the fixed contacts protruding into the receiving depressed portion 51a. That is, after assembling the yoke housing 4, the housing body 51 and the brush holder 7 to protrude the fixed contacts into the receiving depressed portion 51a, it is possible to install the worm wheel 43 and so on easily in the receiving depressed portion 51a. Here, the fixed contacts have elasticity in a direction perpendicular to the surface of the switching plate 54, which is integrally formed on the worm wheel 43, to serve as leaf springs to come in pressure contact with the switching plate 54. Then, after disposing the fixed contacts on the bottom portion of the receiving depressed portion 51a, the worm wheel 43 can be installed in the direction of the elasticity; thereby the fixed contacts can easily and securely come in pressure contact with the switching plate 54.

(2) The brush holder 7 is provided with the connector portion 7e that is disposed outside the yoke housing 4 and the gear housing 41, to connect the external connector of the external control unit (the selector switch 61, the ground and the power source E) thereto; thereby the electric devices are further gathered in the brush holder 7. Thus, the wiring structure of the terminals of the brushes 10a, 10b, the fixed contacts and the connector portion 7e is simplified into only the terminals 21 to 25 as compared with a motor apparatus in which a connector portion and a brush holder are separately disposed. Especially, by forming the brush holder 7 to embed the terminals 21–25 therein by insert molding to arrange the terminals 21–25 in the molded brush holder resinous body 7a, an electric insulation performance of the terminals 21 to 25 is more reliably secured.

(3) The connector portion 7e is disposed at the same side as the worm wheel 43 with respect to the worm shaft 42. Thus, a structure to shorten a distance between the connector portion 7e and the fixed contacts (the contact terminals 22a–24a and the contact members 31–33) goes with a structure to dispose the fixed contacts, which are in slide contact with the switching plate 54 formed on the worm wheel 43, at the same side as the worm wheel 43 with respect to the worm shaft 42 so as not to interfere with worm shaft 42. Accordingly, it is possible to dispose the fixed contacts not to interfere with the worm shaft 42 and to shorten a wiring (terminals 22–24) to connect the fixed contacts and the connector portion 7e. Further, for instance, the fixed contact can be disposed between the holder body portion 7b and the connector portion 7e, so that the brush holder 7 can be formed in a relatively small size.

(4) The brush holder 7 has the contact base portion 7f integrally formed with the holder body portion 7b to extend through the communication hole 51d into the receiving depressed portion 51a together with the fixed contacts (contact terminals 22a–24a and the contact members 31–33). That is, the fixed contacts are supported by the contact base portion 7f, which is integrally formed with the holder body portion 7b, to extend into the receiving depressed portion 51a. Thus, the fixed contacts, provided to come in slide contact with the switching plate 54 formed on the worm wheel 43, can be supported in the proximity to the worm wheel 43 in the gear housing 41; thereby the fixed contacts can easily and reliably be in pressure contact with the switching plate 54. Further, the contact base portion 7f integrally formed with the holder body portion 4b decreases the number of parts of the motor apparatus 1.

(5) The contact base portion 7f and the holder body portion 7b are made of resinous material, and the other face (a lower surface in FIGS. 5 and 6) of the contact base portion 7f, which is opposite from the fixed contacts (the contact terminals 22a–24a and the contact members 31–33) in contact with the switching plate 54, is directly supported by the housing body 51. Thus, the housing body 51 receives a reaction force of a pressure contact force of the fixed contacts, thereby the contact base portion 7f is prevented from deforming and the fixed contacts can more easily and reliably be in pressure contact with the switching plate 54 formed on the worm wheel 43.

Further, the contact base portion 7f, which supports the fixed contacts (the contact terminals 22a–24a and the contact members 31–33), extends from the brush holder resinous body 7a (the extension portion 7d and/or the flange portion 7c between the holder body portion 7b and the connector portion 7e) in the butt joining region B, in which the yoke housing 4 and the gear housing 41 are butt-joined to each other to interpose the brush holder resin body 7a therebetween. Thus, yoke housing 4 and the gear housing 41 confine the brush holder resin body 7a therebetween to decrease a deformation of the brush holder resin body 7a; thereby a rotational position detection accuracy and a switching accuracy by the fixed contacts can be secured.

Furthermore, in the butt joining region B, the yoke housing 4, the gear housing 41 and the brush holder resin body 7a form a watertight space therein. Thus, the watertight space renders the fixed contacts (the contact terminals 22a–24a and the contact members 31–33) waterproofness together with the electric devices mounted on the brush holder resin body 7a.

(6) The fixed contacts comprise the contact terminals 22a–24a, which are parts of the terminals 22–24 disposed in the brush holder 7, and the contact members 31–33, which are anchored on the leading ends (the rising portions 22b–24b) of the contact terminals 22a–24a and which have elasticity from an anchor point at the leading end portions to come in pressure contact with the switching plate 54. Further, the contact base portion 7f is provided with assembly bores 7g on the other face thereof so that the assembly bores 7g align with the leading end portions, namely the rise portions 22b–24b, to fix contact members 31–33 on the rising portions 22b–24b. Thus, it is possible to cotter the contact members 31–33 on the rise portions 22b–24b easily by supporting the bottom sides of the rise portions 22b–24b by the assembly jig inserted through the assembly bores 7g.

Further, the bottom portion of the receiving depressed portion 51a of the housing body 51 is provided with the depression to form the cavity K therein, thereby the leading end portions of the contact terminals 22a–24a (the rise portions 22b–24b) and the contact members 31–33, which are exposed in the assembly bores 7g to the housing body 51, are electrically insulated from housing body 51, which is made of conductor material. Thus, for instance, it is not necessary to form the assembly bores 7g in relatively large lengths to secure electrical insulation between the contact terminals 22a–24a and the contact members 31–33, so that the assembly bores 7g can be formed in relatively small lengths and the contact base portion 7f can be formed in a relatively small thickness.

(7) The cavity K, provided in the depression formed in the housing body 51, serves as the insulation portion; thereby a specific member for the insulation portion is not required, and the above-described effect (6) can be obtained by a relatively simple structure.

(8) The yoke housing 4 is formed in a relatively small thickness in the thickness direction Dt of the motor unit 2 (in the direction perpendicular to the flat portions 4b), and the rotational axis of the worm wheel 43 is set in parallel to the thickness direction Dt of the motor unit 2; thereby the gear housing 41, which installs the worm wheel 43 therein, can be formed in a relatively small thickness in the thickness direction Dt of the motor unit 2. Further, the fixed contacts (the contact terminals 22a–24a and the contact members 31–33) are disposed side by side on the plane in parallel with the flat portions 4b; thereby the gear housing 41 can be formed in a relatively small thickness. Furthermore, it is possible to share a relatively large arranging space in the gear housing 41 in the width direction Dw of the motor unit 2, thereby the electrical insulation among the fixed contacts can be easily secured.

(9) The fixed contacts are disposed side by side to extend approximately in parallel with one another (the contact terminals 22a–24a are in parallel with one another, and the contact members 31–33 are in parallel with one another); thereby the fixed contacts can be installed in a relatively small space, and the fixed contacts can be penetrate through the communication hole 51d formed in a relatively small size. Thus, it is possible to simplify a design of the housing body 51 of the gear housing 41 and to assemble the brush holder 7 and the gear housing 41 (the housing body 51) easily.

(10) The connector portion 7e is disposed at the side of the one arc portion 4a of the yoke housing 4, and, as schematically shown in FIG. 7, the outline of the connector portion 7e is disposed within the range T (refer to FIG. 7) between the pair of the flat portions 4b in the thickness direction Dt of the motor unit 2. Thus, the connector portion 7e allows a relatively small thickness of the motor apparatus 1.

(11) In the fixed contacts (the contact terminals 22a–24a and the contact members 31–33), the base end portions 31b–33b of the inclined portions 31c–33c are disposed at the one flat portion 4b side with respect to the worm shaft 42, that is, closer to the one flat portion 4b than to the other flat portions 4b, which is coaxial to the rotational axis of the armature 6. Thus, the fixed contacts can be easily disposed at the bottom portion side of the receiving depressed portion 51a, so that the fixed contacts do not interfere with the worm wheel 43 in the thickness direction Dt of the motor unit 2 except the leading end portion 31d–33d.

(12) The output shaft 46 is rotatably supported by the output shaft receiving portions 51h formed in the housing body 51. Thus, especially in such cases that the housing body 51 is made of aluminum alloy as in the present embodiment, the output shaft 46 can be supported easily and tightly as compared with a structure that the output shaft is supported by a cover fixed on a housing body. Further, the sector gear 44 is disposed at the opening side in the receiving depressed portion 51a with respect to the worm wheel 43, so that the fixed contacts are disposed over one face of the worm wheel 43 and the sector gear 44 is disposed over the other face of the worm wheel 43. Thus, the fixed contacts do not interfere with the sector gear 44, so that an arrangement of the fixed contacts and the sector gear 44 can be easily designed. Furthermore, it is possible to dispose the fixed contacts at the bottom portion side of the receiving depressed portion 51a in assembling the yoke housing 4, the housing body 51 and the brush holder 7, and then to install the worm wheel 43 and the sector gear 44 step by step into the receiving depressed portion 51a; thereby the assembly of the motor apparatus 1 becomes easy.

The above-described embodiment can be modified as in the following.

In the above-described embodiment, the contact terminals 22a–24a and the contact members 31–33 form the fixed contacts. However, other constituents may form the fixed contact provided the fixed contacts are disposed in the brush holder 7 to extend through the communication hole 51d into the receiving depressed portion 51a of the gear housing 41. For example, the terminals 22–24 and the contact terminals 31–33 may be integrally formed, so that portions corresponding to the contact terminals 22a–24a and the contact terminals 31–33 form the fixed contacts. In this structure, the number of parts can be reduced. Further, for example, portions of the terminals 22–24 corresponding to the contact terminals 22a–24a may be formed separately from the other portions of the terminals 22–24 to be integrated in the contact terminals 31–33. In this structure, the terminals 22–24 are not provided with the contact terminals 22a–24a, and connected to the contact terminals 31–33 at positions outside the receiving depressed portion 51a of the gear housing 41.

The connector portion 7e, which is formed in the brush holder 7, is not limited to this structure, and may be separately formed from the brush holder 7 (holder body portion 7b).

In the above-described embodiment, the connector portion 7e has a structure to be disposed at the same side as the worm wheel 43 with respect to the worm shaft 42. However, the arrangement of the connector portion 7e is not limited to this structure, and may be modified so that the connector portion 7e and the worm wheel 43 interpose the worm shaft 42 therebetween (so that the connector portion 7e and the worm wheel 43 are disposed at opposite sides from each other with respect to the worm shaft 42).

In the above-described embodiment, the brush holder 7 has a structure to have the contact base portion 7f, which is integrally formed with the holder body portion 7b to extend through the communication hole 51d into the receiving depressed portion 51a and support the fixed contacts. However, the present invention is not limited to this structure, and may be modified into other structures. For example, a contact base portion, which supports the fixed contacts, may be separately formed from the holder body portion and fixed to the brush holder to extend through the communication hole 51d into the receiving depressed portion 51a. Alternatively, the contact base portion, which is separately formed from the holder body portion, may be fixed to the gear housing. Further, the brush holder may support the fixed contacts only outside the receiving depressed portion 51a of the gear housing 41.

In the above-described embodiment, the housing body 51 directly supports the contact base portion 7f. However, the structure may be modified such that the contact base portion 7f is not in direct contact with the housing body 51.

In the above-described embodiment, the contact base portion 7f is provided with the assembly bores 7g. However, the configuration may be modified such that the contact base portion 7f is not provided with the assembly bores 7g. Further, the contact members 31–33, which are fixed to the leading end portions of the contact terminals 22a–24a by cottering in the above-described embodiment, may be alternatively fixed by spot welding and the like. In this case, the assembly bores 7g may be used to insert a jig for the spot welding.

In the above-described embodiment, the portion of the housing body 51, which corresponds to the assembly bores 7g, is provided with the depression to provide the cavity K, which serves as the insulation portion. However, the present invention is not limited to this structure, and the portion of the housing body 51, which corresponds to the assembly bores 7g, may be provided with other insulation portions formed by other members (for example, an insulation seal and the like).

In the above-described embodiment, the yoke housing 4 is formed in a flat shape, to be suitable for a motor of the wiper system installed inside a door of a vehicle. However, the shape of the yoke housing 4 is not limited to this structure and may be modified to a cylindrical one or others.

In the above-described embodiment, the fixed contacts are disposed side by side to extend in parallel to each other (the contact terminals 22a–24a are in parallel to each other, and the contact members 31–33 are in parallel to each other). The contact members may be disposed to extend in different directions from each other. Further, the contact members 31–33, which have an identical shape in the above-described embodiment, may have different shapes from each other such in their length.

The connector portion 7e is not limited to be disposed at the side of the arc portion 4a of the yoke housing 4 as in the above-described embodiment, and may be modified to be disposed at a side of the flat portion 4b of the yoke housing in the thickness direction Dt of the motor unit 2. Further, the connector portion 7e is not limited to be disposed so that the outline G of the flat portion 4b in the opposing direction is within the range T between the pair of the flat portions 4b in the thickness direction Dt of the motor unit 2, and may be disposed so that the outline G protrudes beyond the range T even when the connector portion 7e is disposed at a side of the arc portion 4a.

The housing body 51 is not limited to be made of aluminum alloy as in the above-described embodiment, and may be made of other metallic materials or electrical insulating resinous material. When the housing body 51 is made of electric insulating resinous material, the cavity K (the insulation portion) is not required.

The motor apparatus according to the present invention is not limited to the motor apparatus 1 for the rear wiper system as in the above-described embodiment, and can be naturally applied for a front wiper system. In this case, for example, the motor apparatus may be formed without the sector gear 44 and the distance keeping plate 45 to rotate an output shaft integrally with the worm wheel 43, and the output shaft is connected to a front wiper via a link mechanism mounted on a vehicle. Further, the motor apparatus according to the present invention may be applied for systems other than a wiper system (such for a power window system and a sunroof system). Furthermore, the sector gear 44, which connects the worm wheel 43 and the output shaft 46, may be modified to other sub gear member such as a simple speed reduction gear in accordance with usage of the motor apparatus.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor apparatus comprising:
    a motor unit provided with:
        a yoke housing,
        an armature rotatably supported by the yoke housing, and
        a brush in electrical contact with the armature to supply an electric power to the armature;
    a brush holder unit formed from electrical insulating resinous material and provided with:
        a holder body portion that holds the brush,
        a connector portion integrally formed with the holder body portion to extend outward from the holder body portion in a radial direction of the motor unit,
        a contact base portion integrally formed with the holder body portion, at least a part of the contact base portion being connected with the holder body portion at an outside of a width of the yoke housing in the radial direction,
        an internal terminal held by the holder body portion and in electrical contact with the brush,
        an external terminal held by the connector portion, to be connected to an electrical power source, and
        a plurality of contact members that are held by the contact base portion; and
    a switching unit provided with:
        a switching plate rotatably driven by the motor unit and having a predetermined electrical conductor pattern to come in contact with the contact members to connect and disconnect between the internal terminal and the external terminal in accordance with a rotational position of the switching plate to connect and disconnect between the internal terminal and the external terminal, and
        a gear housing fixed to the motor unit to clamp the holder body portion between the yoke housing and the gear housing, and enclosing the switching plate and the contact base portion therein, the gear housing being provided with a communication hole which lets the contact base portion and the contact members protrude therethrough toward the switching plate, to block inner spaces of the yoke housing and the gear housing from an outer space.

2. The motor apparatus according to claim 1, wherein:
    the switching unit is further provided with: a worm shaft integrally rotating with the armature, and a worm wheel reducing and outputting a rotation of the worm shaft, the worm shaft and the worm wheel being enclosed in the gear housing; and
    the switching plate is fixed on one side face of the worm wheel.

3. The motor apparatus according to claim 2, wherein:
    the gear housing and the connector portion are disposed approximately at the same side of an axis of the worm shaft.

4. The motor apparatus according to claim 1, wherein the holder body portion includes a flange portion that extends along a radially outer circumference of the holder body portion, the flange portion being clamped between the yoke housing and the gear housing.

5. The motor apparatus according to claim 1, wherein the connector portion is exposed outside the yoke housing.

6. The motor apparatus according to claim 1, wherein:
    the gear housing supports the contact base portion to receive a reaction force generated by the contact between the contact members and the switching plate.

7. The motor apparatus according to claim 1, wherein:
the internal terminal and the external terminal includes respective lead portions fixed on the holder body portion and connected to at least one of the contact members and the brush.

8. The motor apparatus according to claim 1, wherein:
the contact members are cantilever springs disposed so that leading end portions thereof are in pressure contact with the switching plate.

9. The motor apparatus according to claim 7, wherein:
least a part of the lead portions is embedded in the contact base portion; and
the contact base portion is provided with a working hole that penetrates through the contact base portion to expose the lead portions therein for cottering the contact members to the lead portions in the working hole.

10. The motor apparatus according to claim 9, wherein:
the gear housing is made of an electrical conducting material and provided with an insulation portion electrically insulating the lead portions in the working hole from the gear housing.

11. The motor apparatus according to claim 10, wherein the insulation portion is a cavity in a depression formed on an inner face of the gear housing.

12. The motor apparatus according to claim 2, wherein:
the yoke housing has a flat shape to have a radial thickness in a width direction larger than in a thickness direction; and
the contact members are disposed approximately perpendicular to the thickness direction.

13. The motor apparatus according to claim 12, wherein a plurality of the contact members are disposed in parallel to each other.

14. The motor apparatus according to claim 12, wherein:
the connector portion is disposed at a side of the yoke housing in the width direction; and
the connector portion is shaped to be disposed within the radial thickness of the yoke housing in a thickness direction.

15. The motor apparatus according to claim 12, wherein respective contact members are provided with an inclined portion which is inclined toward the switching plate, a base end portion of the inclined portion being held by the contact base portion at a position displaced in the width direction with respect to the worm shaft, and a leading end portion of the inclined portion being in pressure contact with the switching plate.

16. The motor apparatus according to claim 2, wherein the gear housing is further provided with:
a receiving portion receiving the worm wheel therein and opening to the other side face of the worm wheel; and
a cover portion covering the receiving portion.

17. The motor apparatus according to claim 16, wherein the contact members extend into a space between a bottom face of the receiving portion and the one side face of the worm wheel, the bottom face being opposite from the cover portion.

18. The motor apparatus according to claim 16, wherein the switching unit is further provided with:
an output shaft rotatably supported by the gear housing so that a part of the output shaft protrudes beyond the gear housing; and
a sub gear disposed between the worm wheel and the cover portion to transfer a rotation of the worm wheel to the output shaft.

19. The motor apparatus according to claim 18, wherein:
the sub gear converts the rotation of the worm wheel into a reciprocating rotational motion of the output shaft; and
the output shaft is for actuating a wiper for a vehicle.

20. The motor apparatus according to claim 4, wherein at least a part of the contact base portion is connected with the flange portion between the holder body portion and the connector portion.

21. The motor apparatus according to claim 7, wherein at least a part of the lead portions is embedded in at least one of the holder body portion, the connector portion and the contact base portion.

* * * * *